United States Patent [19]

Bloink

[11] Patent Number: 4,772,159

[45] Date of Patent: Sep. 20, 1988

[54] CLAMPING DEVICE FOR BLADE ASSEMBLY OF ROTARY CUTTING TOOL

[75] Inventor: Harry W. Bloink, Redford, Mich.

[73] Assignee: Illinois Tool Works Inc., Chicago, Ill.

[21] Appl. No.: 529,441

[22] Filed: Sep. 6, 1983

[51] Int. Cl.$^4$ .............................................. B26D 1/12
[52] U.S. Cl. ............................................ 407/37; 407/45;
407/94; 408/146; 408/151
[58] Field of Search ........................... 407/106–112,
407/41, 49, 94, 45, 34–40; 144/230; 408/146,
147, 151, 153

[56] References Cited

U.S. PATENT DOCUMENTS

| 1,413,665 | 4/1922 | Lane et al. | 144/230 |
|---|---|---|---|
| 2,559,950 | 7/1951 | Davis | 82/45 |
| 2,998,634 | 9/1961 | Raehrs et al. | 407/108 |
| 3,598,499 | 8/1971 | Dillon | 408/153 |
| 4,018,542 | 4/1977 | Lindsay | 408/153 |
| 4,164,380 | 8/1979 | Peters | 407/49 |
| 4,428,704 | 1/1984 | Kalokhe | 407/37 |

FOREIGN PATENT DOCUMENTS

| 50464 | 5/1984 | Poland | 407/38 |
|---|---|---|---|
| 665993 | 6/1979 | U.S.S.R. | 407/105 |
| 730498 | 4/1980 | U.S.S.R. | 407/41 |

*Primary Examiner*—M. Jordan
*Attorney, Agent, or Firm*—T. W. Buckman; D. T. Roche

[57] ABSTRACT

A blade clamping device for securing a blade assembly on a rotary cutting tool having a body formed with a cylindrical surface concentric with the axis of the cutting tool. The clamping device selectively locks the blade assembly in position along a radially disposed track which is defined by an elongated slot extending radially from the cutting tool body's outer diameter to its inner bore and a key-shaped channel formed inwardly of the elongated slot's bottom wall. A ball head screw is slidingly retained in the key-shaped channel such that its threaded shank is held in threaded engagement with a threaded aperture formed in the blade assembly in order to provide a means to selectively clamp the blade assembly in position along the elongated slot.

13 Claims, 2 Drawing Sheets

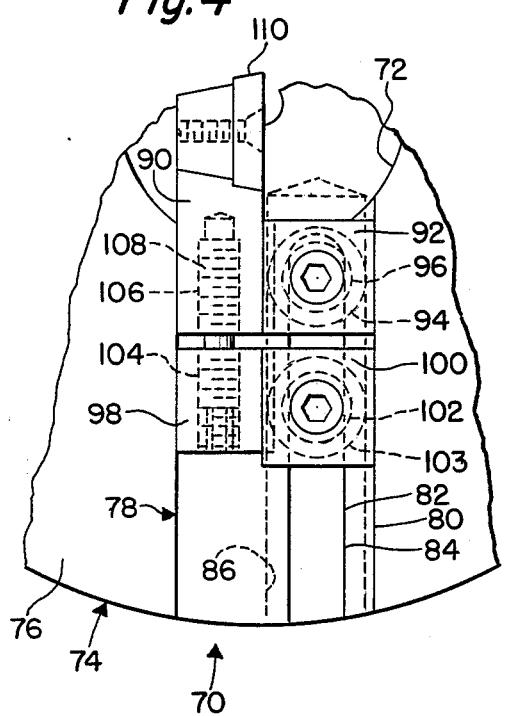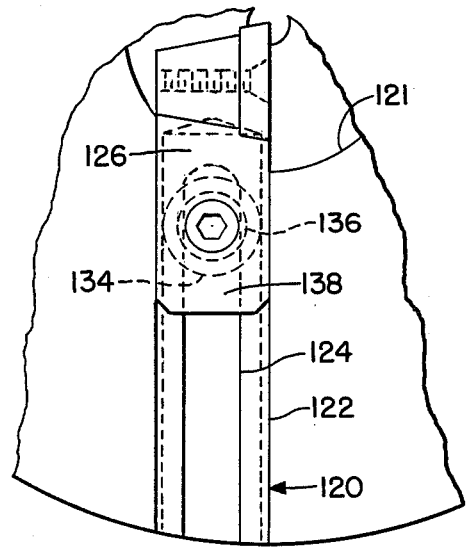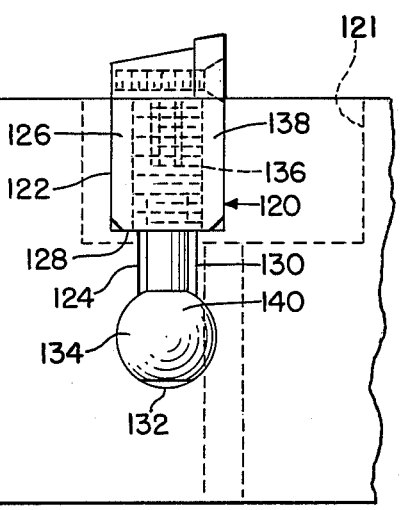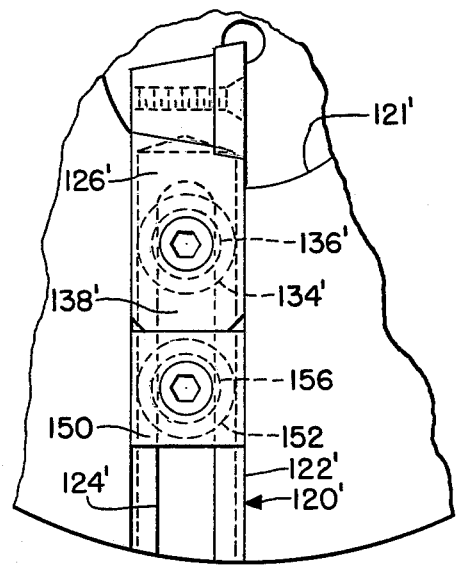

4,772,159

CLAMPING DEVICE FOR BLADE ASSEMBLY OF ROTARY CUTTING TOOL

BACKGROUND OF THE INVENTION

This invention relates to a clamping device for blade assemblies mounted on cutting tools and in particular for blade assemblies used on rotary cutting tools.

A blade and its associated cartridge in a rotary-type cutting tool are exposed to very large radially outward directed forces as the cutting tool performs the cutting operation on a workpiece. To withstand these large forces, the clamping device for blade cartridge must have large holding power to keep the blade in a fixed cutting position.

The deficiency of prior art clamping devices for rotary cutting tool blade assemblies is that their range of adjustability is very limited. Furthermore most prior art clamping devices are quite complicated in design making them expensive to manufacture and making it difficult to replace the blade assemblies. As will be understood in reading the specification and viewing the attached patent drawings, this invention overcomes prior art deficiencies by providing a clamping device that can be secured in place anywhere along a radial track that extends the entire length of the rotary cutting tool cylindrical body surface. Furthermore this invention has several different features that provides a number of alternatives to increase the holding power of the clamping device as required.

SUMMARY OF THE INVENTION

A blade clamping device constructed in accordance with the principles of this invention employs a ball headed screw which is slidingly mounted in a conforming channel formed in a cutting tool's body and which is threadingly engaged with the blade assembly in a manner to selectively lock the blade assembly at any position along the cutting tool's channel.

DESCRIPTION OF DRAWINGS

For a better understanding of this invention, reference may be made to the accompanying drawings, in which:

FIG. 4 is a partial top plan view of a cutting tool body showing another embodiment of this invention;

FIG. 5 is a partial top elevational view of a rotary cutting tool body illustrating a third embodiment of this invention;

FIG. 6 is a front elevational view FIG. 6;

FIG. 7 is a partial top plan view of a rotary tool body illustrating a fourth embodiment of this invention.

DESCRIPTION OF PREFERRED EMBODIMENT

Figure 1:
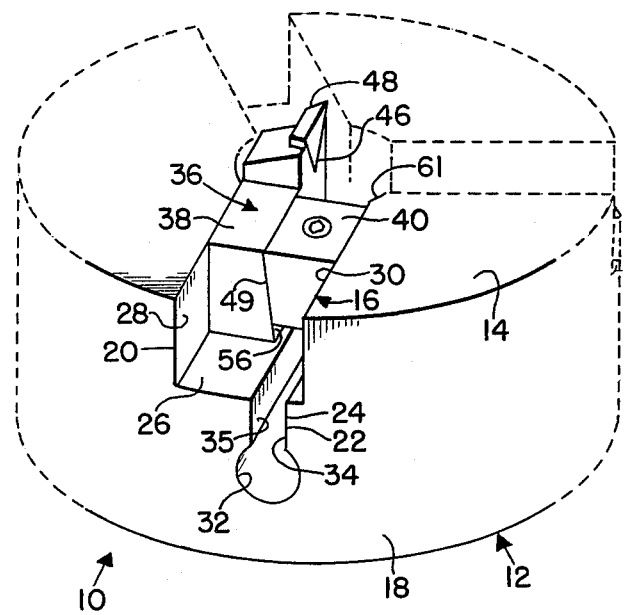
FIG. 1 is a perspective view of a rotary cutting tool illustrating the preferred embodiment of this invention on a cutting tool body shown in dotted lines.

Referring to FIG. 1, there is shown a cutting tool generally designated by the reference numeral 10 of the type used to mill a workpiece (not shown) which would be positioned axially through its center opening 11. Cutting tool 10 has a body 12 formed with a cylindrical surface 14 which is concentric with the axis of the cutting tool.

A plurality of identical tracks 16 (only one being shown in solid lines) are formed in the cylindrical surface 14 to extend radially between the central circular recess 61 and the outer circumferential edge 18 of cylindrical surface 14.

Each track comprises an elongated slot 20 and a key-shaped channel 22, whose neck portion 24 extends inwardly of the bottom wall 26 of elongated slot 20. One of the important features of this invention is the shape of the elongated slot 20 and the key-shaped channel 22. The elongated slot 20 has parallel side walls 28 and 30 which are perpendicular to bottom wall 26. The key-shaped channel 22 has a circular cross sectional head section 32 and a neck portion 24 with parallel sides 34,35. It will be appreciated that the key-shaped channel 22 has a shape which is very simple to manufacture. It can be done either by drilling or reaming rather than the more complicated slotting.

Figure 2:
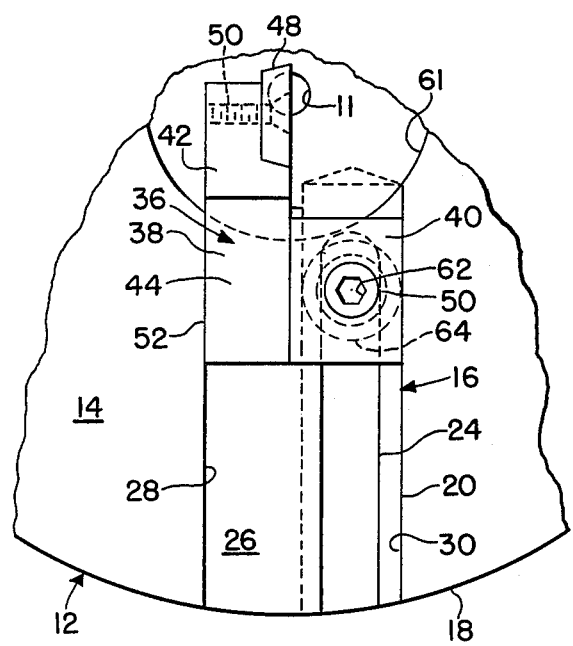
FIG. 2 is a partial top plan view of FIG. 1.
Figure 3:
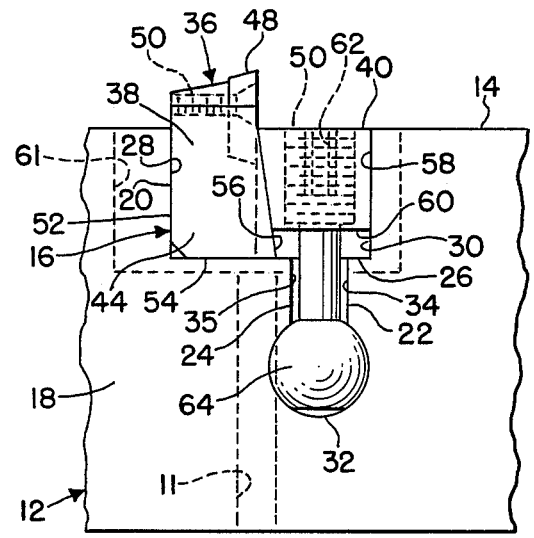
FIG. 3 is a partial elevational view of the cutting tool body locking directly along the radial track illustrated in solid lines.

A blade assembly 36 is slidingly disposed in the elongated slot 20 as shown in FIGS. 1, 2 and 3. Blade assembly 36 is composed of blade cartridge 38 and wedge block 40.

Blade cartridge 38 is formed integrally with a forward block portion 42 and rearward block portion 44. The forward block portion 42 is taller in height than the rearward block portion 44 and has a seat 46 at its upper end for receiving an insertable carbide blade 48, which is threadedly secured thereto by means of screw 50 threaded into a threaded aperture (not shown) in seat 46. The rearward block portion 44 is slightly longer in length than the wedge block 40 and has its side wall 52 and bottom wall 54 formed at right angles to each other in order to be in contact with side wall 28 and bottom wall 26, respectively, of elongated slot 20. The other side wall 56 has a slight slanted angle as compared to side wall 52 for reasons that will be explained herein.

Wedge block 40 is shorter in both height and length than rearward block portion 44 of blade cartridge 38. Wedge block 40 has a side wall 58 and bottom wall 60 formed at right angles, and side wall 62 formed at a slanted angle relative to side wall 58. The slant of side wall 62 is at an angle equal to but in the opposite direction of slanted side wall 56 of rearward block portion 44.

It will be appreciated by referring to FIG. 3 that the use of equal but opposite slanted surfaces on the mating faces of wedge block 40 and rearward block portion 44 permit the wedge block 40 to slide down the side wall surface 56 at the same time that the straight side wall 58 slides down side wall 30 of elongated slot 20 until there is complete wedging engagement along the abutting surfaces of rearward block portion 44 and wedge block 40. By virtue of this arrangement, it is possible to make the elongated slot 20 with side walls perpendicular to its bottom wall 26. It will be appreciated that having this squared off relationship of elongated slot 20 permits the machining of the slot to be quite simple.

From the foregoing description it will be apparent that blade assembly 36 can be selectively positioned along a track 16 at any desired location between the circumferential edge 18 to the central circular recessed area 61. Once the position is established, all that is necessary to firmly lock the blade cartridge 38 is to turn the ball headed screw 50 through its hex socket 62 (FIG. 2) extending upwardly through wedge block 40 in a direction to cause the wedge block to be drawn downwardly into wedging engagement with cartridge 38. Because of the tapered wedge, wedge block 40 will lock up before the drag on the end of the screw could move it out of position. Thus eliminating any unwanted movement of the cartridge blade after its set position is located.

When it is desired to relocate the position of blade cartridge 38, the ball headed screw 50 is turned in the opposite direction. This action will cause the ball head 64 to immediately strike the bottom of circular head section 32 and force the wedge upwardly to free it of its wedging engagement with cartridge 38. This unwedging action caused by the interaction of the ball head 64 and circular head section 32 makes the repositioning of the blade cartridge very easy.

DESCRIPTION OF SECOND EMBODIMENT

There is shown in FIGS. 4 and 5, the second embodiment of this invention. This embodiment is illustrated with a cutting tool identical to that of the first embodiment which is generally designated by the reference 70 having a central recess 72. Cutting tool 70 has a body 74 adapted to be mounted on a spindle in a conventional manner and includes a cylindrical surface 76.

There is formed in the cylindrical surface 76 a plurality of radial tracks 78. Only one such track is depicted in FIG. 4. Tracks 78 are identical in shape and size as tracks 16 (FIGS. 1-3).

Each of the tracks 78 are formed in the identical manner to track 16 of FIGS. 1 through 3, and comprise elongated slot 80 and key-shaped channel 82. Key-shaped channel 82 has a neck portion 84 which interconnects its circular portion 86 to the bottom wall of elongated slot 80.

There is mounted in each of the tracks 78 a blade cartridge 90 and cooperating wedge block 92, which are brought into tight interfitting relationship by the clamping device comprising ball headed screw 94 which is brought into threaded engagement with wedge block 92 through its threaded aperture 96. It will be appreciated that the clamping device of FIG. 4 is identical to the clamping device described with reference to the first embodiment (FIGS. 1 through 3).

To increase the holding force of the clamping device and to provide a further means of accurately positioning the blade cartridge 90, there is provided in FIG. 4 a holding block 98 and second wedge block 100. Wedge block 100 has a threaded aperture 102 in alignment with the key-shaped channel 82. A second ball headed screw 103 is slidingly disposed in the key-shaped channel 82 and in threaded engagement with threaded aperture 102 of wedge block 100.

Holding block 98 has the same general configuration as the rearward block portion 44 of the first embodiment. To provide the accurate positioning of the blade cartridge block 90 holding block 98 and blade cartridge 90 are formed with threaded apertures 104 and 106, respectively, which extend through these blocks in a radial direction as depicted in FIG. 4.

A positive fine adjustment means for blade cartridge 90 is provided through the cooperating action of a differential screw 108 which has one end mounted in threaded aperture 104 and the other end mounted in threaded aperture 106. As is well known in the art differential screw 108 has one end with a right handed thread and the other end with a left handed thread so that its turning in one direction causes the two blocks 98 and 90 to be either moved towards each other or away from each other.

To use the clamping device of the second embodiment the blade cartridge 90 is moved to its estimated cutting position along track 78. At this point in time ball headed screw 103 is tightened to bring wedge block 101 into a tight interfitting relationship with holding block 98. The differential screw is then turned to make a fine adjustment of the location of blade cartridge 90 and its associated blade 110. Once the position of blade 110 is accurately located, the ball headed screw 94 is tightened to bring wedge block 92 into tight interfitting relationship with blade cartridge 90. To move the blade cartridge to a new cutting position, the above stated steps are performed in reverse.

DESCRIPTION OF THIRD EMBODIMENT

Referring to FIGS. 5 and 6 there is shown a third embodiment of this invention. This embodiment would use a similar cutting tool as that depicted with reference to the first and second embodiment including a plurality of radial tracks 120, being partially shown in FIGS. 5 and 6. Track 120 extends the radial distance from the circumferential edge to the central circular recess 121, as depicted in FIGS. 2 and 4. Track 120 is formed with an elongated slot 122 and key-shaped channel 124. Elongated slot 122 is of the same general cross-sectional configuration as slot 20 in FIG. 1 and slot 80 in FIG. 4 with the exception that its width is much smaller. In this embodiment the slot 122 is only wide enough to accommodate the width of the blade cartridge 126.

A key-shaped channel 124 is formed inwardly of the bottom wall 128 of elongated slot 122 and comprises a neck portion 130 and circular section 132.

The clamping means for this embodiment is provided by a ball headed screw 134 which is in threaded engagement with a threaded aperture 136 formed through the center of the rearward block portion 138 of blade cartridge 126.

To clamp the blade cartridge 126 in position, the ball headed screw is tightened until the head 140 of the ball headed screw 134 abuts against the circular section 132 of key-shaped channel 124 in a manner depicted in FIG. 7. To free the blade cartridge 126 the ball headed screw is untightened until blade cartridge 126 is able to slide.

It will be appreciated that the holding force of clamping device depicted in FIGS. 5 and 6 is less than that provided by the first and second embodiment. However for many cutting operations it would provide more than enough holding force for maintaining the blade cartridge 126 in position.

DESCRIPTION OF FOURTH EMBODIMENT

If the holding force of the blade cartridge 126 of FIGS. 5 and 6 is found insufficient, one way of increasing its holding strength is depicted in FIG. 7.

The embodiment of FIG. 7 is identical to that with FIG. 5 with the addition a backer block 150. For this reason like parts of FIG. 7 to those of FIGS. 5 and 6 are designated with a prime number.

The added holding force of FIG. 7 is provided through the clamping arrangement of a second threaded ball headed screw 152 which is slidingly engaged in the key-shaped channel 124' and has its threaded shank 154 screwed into a threaded aperture 156 extending upwardly through backer block 150. It will be readily appreciated that the addition of the clamping arrangement provided in the backer block 150 will substantially increase the holding power as compared to that of the clamping device of FIG. 5.

If the backer block 150 is found deficient in holding power, it could be tack welded into the elongated slot 122 once the position of the blade cartridge is established.

In all of the above four embodiments there is described a unique clamping device which provides a new and novel means of securing a blade cartridge at a desired location at any position along a radial track on a cutting tool body. The use of a ball headed screw in cooperation with a threaded aperture in the blade assembly provides a very effective way of clamping and is quite economical to manufacture. The track in each of the embodiments is formed with a square-shaped elongated slot which is easy to form and a contiguous key-shaped channel comprising a parallel neck portion and circular section which can be readily formed by drilling or reaming. Thus the clamping device embodying the principles of this invention is easy to manufacture and to use.

I claim:

1. A blade clamping device for a blade assembly of a cutting tool, where said cutting tool has a body with a cylindrical surface concentric with the axis of said cutting tool, said body including at least one track formed in said cylindrical surface extending radially of its axis, said at least one track includes an elongated slot for slidably receiving said blade assembly and a parallel key-shaped channel formed inwardly of the bottom wall of said slot, said blade clamping device comprises a ball headed screw having a ball head portion of a size to be slidably retained in the head section of said key-shaped channel and having a threaded shank portion extending through the neck section of said key-shaped channel and into said elongated slot, said head section of said key-shaped channel having a circular shape slightly larger than said ball headed portion of said ball headed screw, drive means formed in the outer end of said threaded shank portion of said ball headed screw for selectively turning said ball headed screw, and said blade assembly includes means for threadedly engaging said threaded shank for selectively clamping said blade assembly in a fixed position along said elongated slot by turning said drive means.

2. A blade clamping device as defined in claim 1, wherein said blade assembly comprises a blade cartridge slidably received in said slot, and said means for threadedly engaging said threaded shank of said ball head screw comprises a threaded aperture formed through said blade cartridge in alignment with said key-shaped channel.

3. A blade clamping device as defined in claim 2, wherein said blade assembly further comprises a backer block slidably mounted in said slot in abutting relationship with said blade cartridge on its radially outbound side and a threaded aperture formed through said backer block in alignment with said key-shaped channel, and wherein said clamping device further comprises a second ball head screw slidably disposed in said key-shaped channel and in threaded engagement with said threaded aperture in said backer block.

4. A blade clamping device as defined in claim 1, wherein said blade assembly further comprises a wedge block slidably disposed in said elongated slot in a side-by-side abutting relation with a blade cartridge, wherein said blade clamping device comprises a threaded aperture through said wedge block in alignment with said key-shaped channel, and in threaded engagement with said threaded shank of said ball headed screw.

5. A blade clamping device as defined in claim 4, wherein said blade assembly further comprises a backer block and a second wedge block slidably disposed on the radially outbound side of said blade cartridge and said first mentioned wedge block respectively and in a side-by-side relation with each other, and wherein said clamping device further comprises a second threaded aperture through said second wedge block in alignment with said key-shaped channel, and a second ball headed screw slidably disposed in said key-shaped channel and in threaded engagement in said second threaded aperture of said second wedge block.

6. A blade clamping device as defined in claim 5, wherein said blade assembly further comprises aligned threaded openings in said first and second wedge blocks which extends in parallel with said elongated slot, and a differential screw having opposite ends threaded into said first and second wedge blocks for radially positioning said blade cartridge prior to tightening said ball headed screw in said first wedge.

7. A blade clamping device for a blade assembly of a cutting tool, where said cutting tool has a body with a cylindrical surface concentric with the axis of said cutting tool, said body includes at least one track formed in said cylindrical surface in a radial direction from said axis, said at least one track includes an elongated slot for slidably receiving said blade assembly and a parallel key-shaped channel formed inwardly of the bottom wall of said slot, said blade assembly comprises a blade cartridge and wedge block slidably disposed in said elongated slot in side-by-side abutting relation, said wedge block having a threaded aperture formed therethrough in alignment with said key-shaped channel, and said blade clamping device comprises a ball headed screw having a ball head portion of a size to be slidably retained in the head section of said key-shaped channel and having a threaded shank portion extending through the neck section of said key-shaped channel into threaded engagement with said threaded aperture in said wedge block, the head section of said key-shaped channel having a circular shape slightly larger than said ball headed portion of said ball headed screw, drive means formed in the outer end of said threaded shank portion of said ball headed screw for selectively turning said ball headed screw.

8. A blade clamping device as defined in claim 7, wherein said elongated slot has parallel sides and wherein the outer faces of said blade cartridge and wedge block are parallel to said slot and said abutting surfaces of said blade cartridge and wedge block are slanted in equal but opposite angles to cause said wedge to slide down in a parallel direction to said parallel sides of said elongated slot.

9. A blade clamping device as defined in claim 7, wherein said blade assembly further comprises a backer block and second wedge block slidably disposed in said elongated slot radially outbound of said blade cartridge and said first mentioned wedge block, respectively, and in side-by-side abutting relation with each other, and wherein said clamping device further comprises a second threaded aperture through said second wedge block in alignment with said key-shaped channel, and a second ball headed screw slidably disposed in said key-shaped channel and in threaded engagement in said second aperture of said second wedge block.

10. A blade clamping device as defined in claim 9, wherein said blade assembly further comprises aligned threaded openings in said first and second wedge blocks extending in parallel with said elongated slot, and a differntial screw having opposite ends threaded into said first and second wedge blocks for radially positioning said blade cartridge prior to tightening said ball headed screw in said first wedge.

11. A blade clamping device for a blade assembly of a cutting tool, where said cutting tool has a body with a cylindrical surface concentric with the axis of said cutting tool, said body includes at least one track formed in said cylindrical surface extending radially from said axis, said at least one track includes an elongated slot for slidably receiving a blade cartridge of said blade assembly and a parallel key-shaped channel formed inwardly of the bottom wall of said slot, and where said blade clamping device comprises a ball headed screw having a ball head portion of a size to be slidably retained in the head section of said key-shaped channel and having a threaded shank portion extending through the neck section of said key-shaped channel and into said elongated slot, the head section of said key-shaped channel having a circular shape slightly larger than said ball headed portion of said ball headed screw, drive means formed in the outer end of said threaded shank portion of said ball headed screw for selectively turning said ball headed screw, and said blade cartridge includes a threaded aperture in alignment with said key-shaped channel for threadedly engaging said threaded shank of said ball headed screw to clamp said blade assembly in a fixed position along said elongated slot by turning said drive means.

12. A blade clamping device as defined in claim 11, comprising a backer block slidably received in said elongated slot radially outward of said blade cartridge, a threaded aperture formed through said backer block in alignment with said key-shaped channel, and a second ball headed screw slidably received in key-shaped channel and having its threaded shank in threaded engagement with said threaded aperture of said backer block.

13. A blade clamping device as defined in claim 12, further comprising tack welds applied between said backer block and said elongated slot.

* * * * *